US008477011B2

(12) United States Patent
Tubb et al.

(10) Patent No.: US 8,477,011 B2
(45) Date of Patent: Jul. 2, 2013

(54) MLOCK DEVICE AND ASSOCIATED METHODS

(75) Inventors: Earl Fred Tubb, Santa Cruz, CA (US); Diane Quick, Santa Cruz, CA (US); Mark Brinkerhoff, San Jose, CA (US); Thomas Geraty, San Jose, CA (US)

(73) Assignee: iControl, Inc., Santa Clara, CA (US)

( * ) Notice: Subject to any disclaimer, the term of this patent is extended or adjusted under 35 U.S.C. 154(b) by 456 days.

(21) Appl. No.: 12/775,444

(22) Filed: May 6, 2010

(65) Prior Publication Data

US 2010/0283575 A1 Nov. 11, 2010

Related U.S. Application Data

(60) Provisional application No. 61/176,862, filed on May 8, 2009.

(51) Int. Cl.
*H04Q 9/00* (2006.01)

(52) U.S. Cl.
USPC .......... 340/5.73

(58) Field of Classification Search
USPC .......... 340/5.73, 542, 5.6, 5.2; 70/24, 30
See application file for complete search history.

(56) References Cited

U.S. PATENT DOCUMENTS

| | | | | |
|---|---|---|---|---|
| 6,057,779 | A * | 5/2000 | Bates | 340/5.21 |
| 6,803,674 | B2 * | 10/2004 | Crisp | 307/10.2 |
| 7,543,467 | B2 * | 6/2009 | Sheehan | 70/57.1 |
| 8,154,397 | B2 * | 4/2012 | Astrin | 340/505 |
| 2003/0231103 | A1 | 12/2003 | Fisher | 340/5.73 |
| 2005/0199019 | A1 | 9/2005 | Marcelle et al. | 70/38 |
| 2005/0207087 | A1 * | 9/2005 | Fisher et al. | 361/160 |
| 2007/0090921 | A1 * | 4/2007 | Fisher | 340/5.73 |
| 2008/0135446 | A1 | 6/2008 | Pohl | |

FOREIGN PATENT DOCUMENTS

| | | | |
|---|---|---|---|
| WO | 03055769 | A | 7/2003 |
| WO | 2006007867 | A | 1/2006 |

OTHER PUBLICATIONS

International Search Report dated Oct. 17, 2008 (PCT/EP2008/004711); ISA/EP.

* cited by examiner

*Primary Examiner* — Vernal Brown
(74) *Attorney, Agent, or Firm* — Martine Penilla Group, LLP

(57) ABSTRACT

A security device includes a processor defined to control operation of the security device. The security device also includes a radio defined in electrical communication with the processor. The security device also includes a location determination device defined in electrical communication with the processor. The processor, radio, and location determination device are defined to operate collaboratively to provide a wireless tracking and communication system. The security device also includes a shackle and a locking mechanism. The locking mechanism is defined in electrical communication with the processor. The processor is defined to operate the locking mechanism to control locking and unlocking of the shackle based on information obtained through the wireless tracking and communication system.

14 Claims, 7 Drawing Sheets

MLOCK DEVICE AND ASSOCIATED METHODS

CLAIM OF PRIORITY

This application claims priority under 35 U.S.C. 119(e) to U.S. Provisional Patent Application No. 61/176,862, filed May 8, 2009, entitled "mLOCK Device and Associated Methods." The disclosure of the above-identified provisional patent application is incorporated herein by reference.

BACKGROUND

In modern global commerce, it is becoming more important than ever to have an ability to track and monitor assets and their security as they move about the world. Additionally, government and/or commercial institutions may have an interest in knowing the current location of a particular asset, a security status of a particular asset, and in having an accurate and reliable historical record of a particular asset's travels and corresponding security status during those travels. A maritime transport container represents one of many examples of an asset to be tracked and monitored as it travels around the world. Information about a particular asset, such as its current location, where it has traveled, how long it spent in particular locations along its route, and what conditions it was exposed to along its route, can be very important information to both commercial and governmental entities. To this end, a device is needed to track and monitor an asset anywhere in the world, to collect and convey information relevant to the asset's experience during its travels, and to remotely monitor and control the asset's security.

SUMMARY

In one embodiment, a locking device is disclosed. The locking device includes a processor defined to control operation of the locking device. The locking device also includes a radio defined in electrical communication with the processor. The locking device also includes a location determination device defined in electrical communication with the processor. A combination of the processor, the radio, and the location determination device forms a wireless tracking and communication system. The locking device further includes a shackle and a locking mechanism. The locking mechanism is defined in electrical communication with the processor. The processor is defined to operate the locking mechanism to control locking and unlocking of the shackle based on information obtained through the wireless tracking and communication system.

In another embodiment, a locking device is disclosed. The locking device includes a shell and a shackle disposed within a channel inside the shell. The shackle is defined to insert into an opening in the shell to close a shackle loop. The shackle is defined to release from the opening in the shell to open the shackle loop. The locking device also includes a latch plate disposed inside the shell and defined to engage the shackle to lock the shackle, when the shackle is inserted into the shell to close the shackle loop. The locking device also includes a push plate disposed inside the shell. The push plate is defined to be moved within the shell by an applied external force. The locking device also includes a motor mechanically fixed to the push plate. The locking device also includes a cam mechanically connected to be moved by the motor to engage with the latch plate. Movement of the push plate by the applied external force, with the motor operated to engage the cam with the latch plate, causes the latch plate to move to disengage from the shackle, thereby freeing the shackle to release from the shell to open the shackle loop. The locking device further includes a processor defined to monitor a state of the locking device and autonomously control the motor to move the cam based on the monitored state of the locking device.

In another embodiment, a method is disclosed for autonomous operation of a locking device based on a status of the locking device. The method includes an operation for operating a computing system onboard the locking device to automatically determine a real-time status of the locking device. The method also includes operating the computing system to automatically control a locking mechanism of the locking device to either lock or unlock the locking device based on the automatically determined real-time status of the locking device.

In another embodiment, a method is disclosed for operating a locking device. In the method, the locking device is maintained in a minimum power consumption state while waiting for a wakeup signal to be issued by a processor of the locking device. An event is detected that requires the locking device to operate at a normal power level. In response, the processor is operated to issue the wakeup signal to transition the locking device from the minimum power consumption state to the normal power level. A command is received over a wireless communication system of the locking device. The processor is then operated to execute the received command. Following execution of the received command, the locking device transitions from the normal power level back to the minimum power consumption state.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
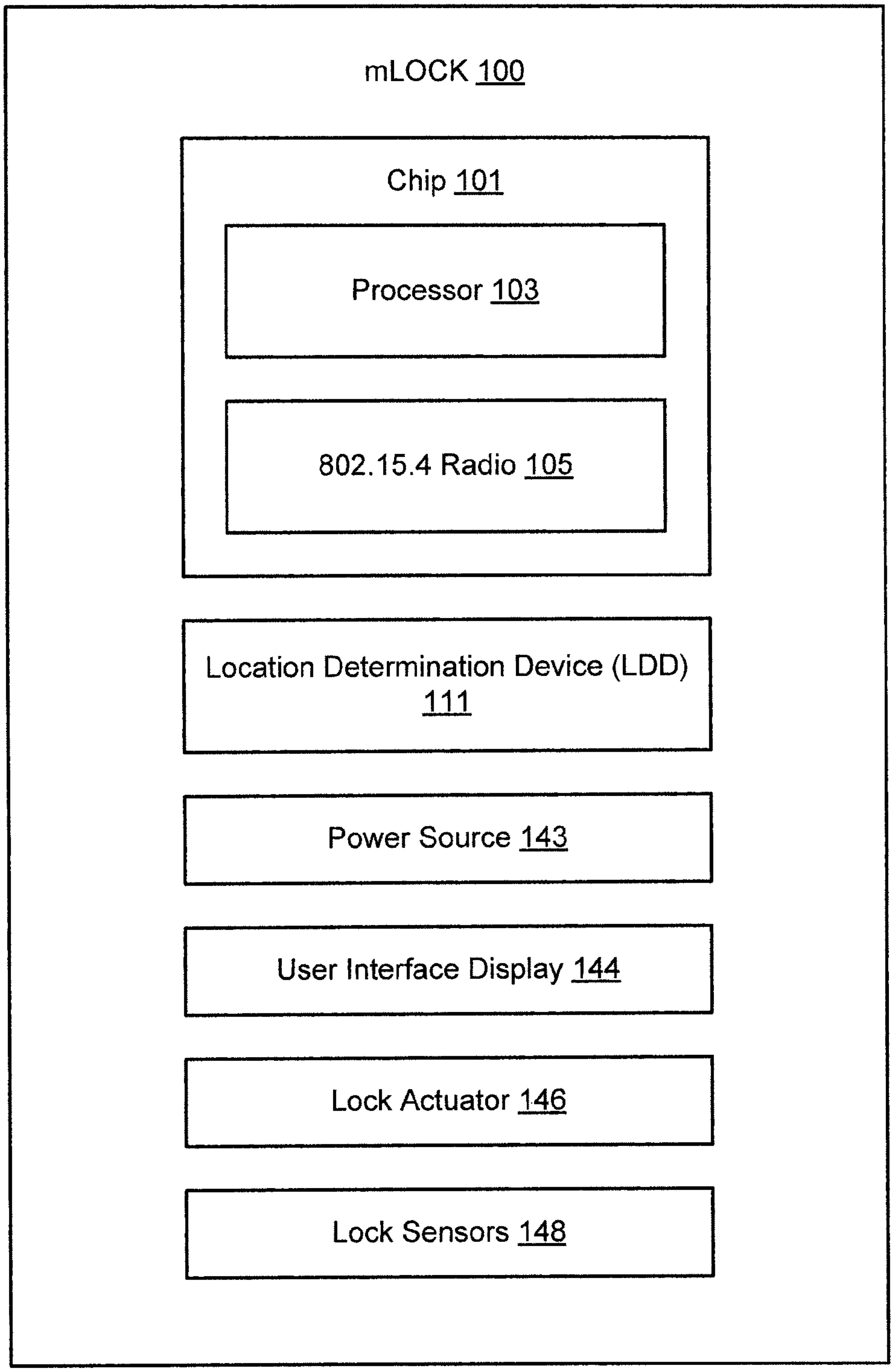
FIG. 1 is an illustration showing an mLOCK device architecture, in accordance with one embodiment of the present invention.

FIG. 1 is an illustration showing an mLOCK 100 device architecture, in accordance with one embodiment of the present invention. The mLOCK 100 includes a radiofrequency (RF) tracking and communication system and a security lock mechanism. The mLOCK 100 includes a processor 103 defined on a chip 101. The mLOCK 100 also includes a radio 105 defined on the chip 101. The radio 105 operates at an international frequency and is defined to efficiently manage power consumption. In one embodiment, the radio 105 is defined as an Institute of Electrical and Electronics Engineers (IEEE) 802.15.4 compliant radio 105. The radio 105 is connected to electrically communicate with the processor 103. It should be appreciated that implementation of the IEEE 802.15.4 compliant radio 105 provides for international operation and secure communications, as well as efficient power management.

The mLOCK 100 further includes a location determination device (LDD) 111 defined to electrically communicate with the processor 103 of the chip 101. In one embodiment, the LDD 111 is defined as a Global Positioning System (GPS) receiver device. Additionally, the mLOCK 100 includes a power source 143 defined to supply electrical power to the processor 103, the radio 105, the LDD 111, and other powered mLOCK 100 components as described below with regard to FIG. 2. In various embodiments, the power source 143 is rechargeable, and may be supported in a trickle-charging manner by solar energy. The mLOCK 100 implements a power management system defined to enable long-term mLOCK 100 deployment with minimal maintenance.

The mLOCK 100 is an electronic lock that secures an asset, such as cargo within a shipping container, by controlling the ability to operate a locking mechanism of the mLOCK 100 based on proximity to secure networks, geographic locations, or via user commands through a radio link. The locking mechanism of the mLOCK 100 is secured through a mechanical mechanism that inhibits opening a shackle of the mLOCK 100 unless an electro-mechanical lock actuator 146 enables such operation of the mLOCK 100.

The lock actuator 146 utilizes a motor that is controlled through power amplified electronics via the processor 103. The lock actuator 146 functions to provide power and signal conversion, based on low power signals generated by the processor 103, to generate enough power so as to appropriately control operation of a lock motor. The lock motor is defined to provide mechanical locking and unlocking of the mLOCK 100 shackle. In one embodiment, the lock motor is a DC motor. Also, in one embodiment, a spring is disposed to link the lock motor output shaft to a cam mechanism that enables/disables operation of the mLOCK 100, i.e., enables/disables operation of the mLOCK 100 shackle. In one embodiment, the lock actuator 146 is defined as an H-Bridge amplifier designed for low voltage DC motors.

The mLOCK 100 also includes one or more lock sensors 148 to determine the lock actuator 146 state (locked or unlocked) and the mLOCK 100 shackle state. In one embodiment, the lock sensor 148 is a limit switch that conveys data indicating a discrete state of the lock actuator 146, i.e., "locked" or "unlocked." The processor 103 is defined to use the lock sensor 148 signal data to determine when the lock actuator 146 is in the correct state during lock actuation, thereby providing feedback to the processor 103 to enable stop/start control of the lock motor by the lock actuator 146. If the lock sensor 148 indicates that the lock mechanism is in the correct commanded state, the processor 103 will not take any control actions. The lock sensors 148 can include a shackle sensor (or cable sensor). The shackle sensor indicates whether the shackle is actually opened or closed. Therefore, the shackle sensor is the indicator that the locking mechanism of the mLOCK 100 has actually been opened or closed, thereby indicating the security state of an asset to which the mLOCK 100 is attached.

The mLOCK 100 also includes a user interface display 144 through which visual information can be conveyed to a user of the mLOCK 100 to enable understanding of a current state of the mLOCK 100. In one embodiment, the user interface display 144 is defined as a two line by eight character liquid crystal display. However, it should be understood that in other embodiments the user interface display 144 can be defined as essentially any type and size of visual display suitable for use in electronic components to visually display textual information, so long as the user interface display 144 fits within the form factor of the mLOCK 100. In one embodiment, the mLOCK 100 includes at least one user activatable button connected to enable selection of different screens to be rendered on the user interface display 144. It should be understood that the user interface display 144 provides a user interface to the processor 103. In one embodiment, the different screens available for rendering in the user interface display 144 convey information including, but not limited to:

a) the mLOCK 100 identification Number, b) the mLOCK 100 state (locked or unlocked), c) the mLOCK 100 location and time (GPS location), d) modem status, if modem is included in mLOCK 100, and e) network status, if the mLOCK 100 is currently in a trusted network area.

In one embodiment, the mLOCK 100 is defined as a self-contained battery operated device capable of being attached to an asset, such as a shipping container, to provide secure tracking and communications associated with movement and status of the asset, and to provide access security for the asset. In certain embodiments, the mLOCK 100 may also be configured to provide/perform security applications associated with the asset. Through communication with local and global communication networks, the mLOCK 100 is capable of communicating data associated with its assigned asset and its security state while the asset is in transit, onboard a conveyance means (e.g., ship, truck, train), and in terminal.

As will be appreciated from the following description, the mLOCK 100 provides complete autonomous location determination and logging of asset position (latitude and longitude) anywhere in the world. The mLOCK 100 electronics provide an ability to store data associated with location way-points, security events, and status in a non-volatile memory onboard the mLOCK 100. The mLOCK 100 is also defined to support segregation and prioritization of data storage in the non-volatile memory. Communication of commercial and/or security content associated with mLOCK 100 operation, including data generated by external devices interfaced to the mLOCK 100, can be virtually and/or physically segregated in the non-volatile memory.

Moreover, in one embodiment, a wireless communication system of the mLOCK 100 is defined to detect and negotiate network access with network gateways at long-range. The mLOCK 100 processor 103 is defined to perform all necessary functions to securely authenticate a serial number of the mLOCK 100, provide encrypted bi-directional communication between the mLOCK 100 and a reader device within a wireless network, and maintain network connectivity when in range of a network gateway.

In one embodiment, the various components of the mLOCK 100 are disposed on a printed circuit board, with required electrical connections between the various components made through conductive traces defined within the printed circuit board. In one exemplary embodiment, the printed circuit board of the mLOCK 100 is a low cost, rigid, four layer, 0.062" FR-4 dielectric fiberglass substrate. However, it should be understood that in other embodiments, other types of printed circuit boards or assemblies of similar function may be utilized as a platform for support and interconnection of the various mLOCK 100 components. In one particular embodiment, the chip 101 is defined as a model CC2430-64 chip manufactured by Texas Instruments, and the LDD 111 is implemented as a model GSC3f/LP single chip ASIC manufactured by SiRF.

Figure 2:
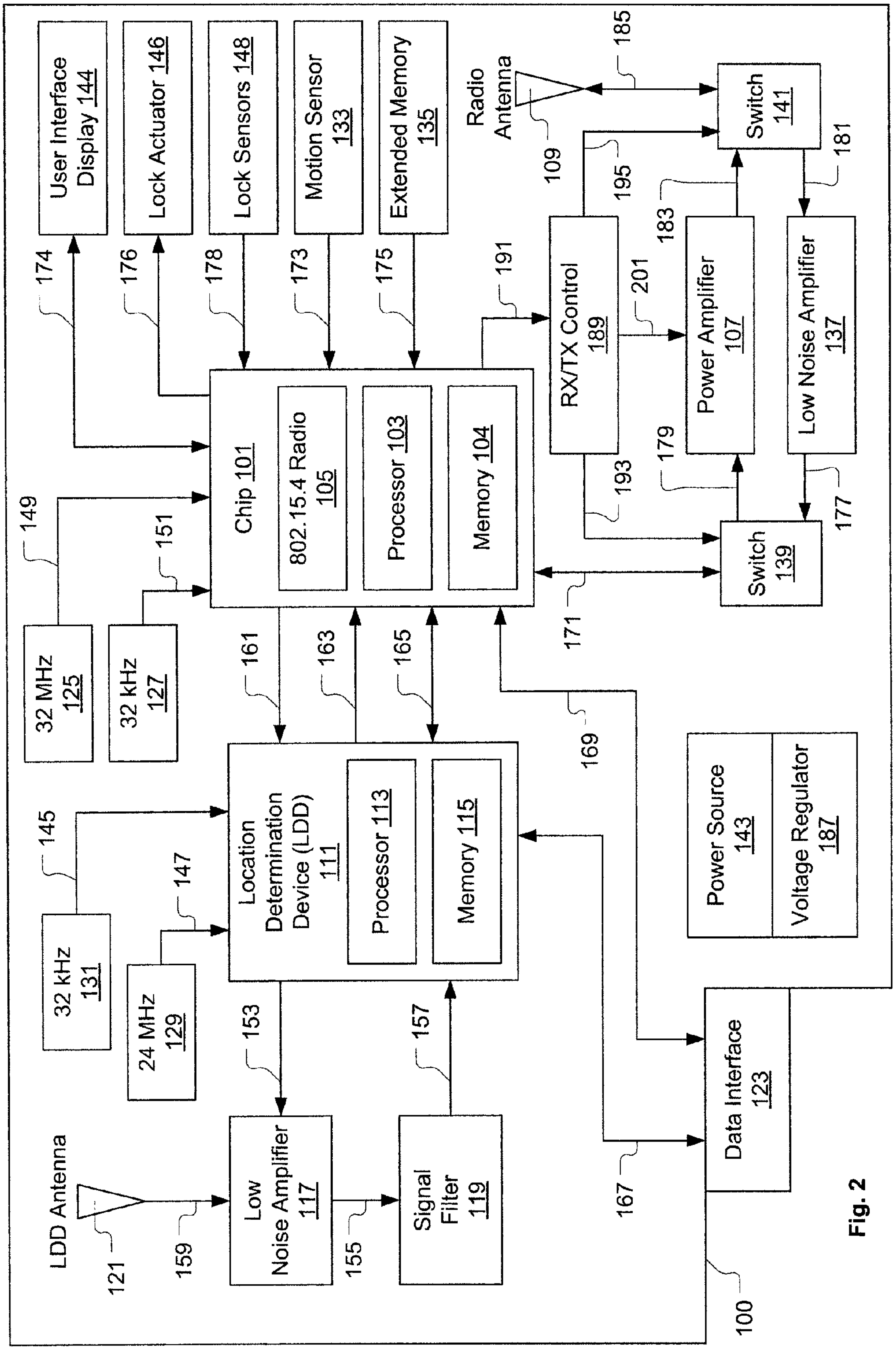
FIG. 2 is an illustration showing a schematic of the mLOCK of FIG. 1, in accordance with one embodiment of the present invention.

FIG. 2 is an illustration showing a schematic of the mLOCK 100 of FIG. 1, in accordance with one embodiment of the present invention. In various exemplary embodiments, the chip 101 that includes both the processor 103 and the radio 105 can be implemented as either of the following chips, among others:

a model CC2430 chip manufactured by Texas Instruments,
a model CC2431 chip manufactured by Texas Instruments,
a model CC2420 chip manufactured by Texas Instruments,
a model MC13211 chip manufactured by Freescale,
a model MC13212 chip manufactured by Freescale, or
a model MC13213 chip manufactured by Freescale.

In each of the above-identified chip 101 embodiments, the radio 105 is defined as an IEEE 802.15.4 compliant radio that operates at a frequency of 2.4 GHz (gigaHertz). It should be understood, that the type of chip 101 may vary in other embodiments, so long as the radio 105 is defined to operate at an international frequency and provide power management capabilities adequate to satisfy mLOCK 100 operation and deployment requirements. Additionally, the type of chip 101 may vary in other embodiments, so long as the processor 103 is capable of servicing the requirements of the mLOCK 100 when necessary, and enables communication via the radio 105 implemented onboard the chip 101. Also, the chip 101 includes a memory 104, such as a random access memory (RAM), that is read and write accessible by the processor 103 for storage of data associated with mLOCK 100 operation.

The mLOCK 100 also includes a power amplifier 107 and a low noise amplifier (LNA) 137 to improve the communication range of the radio 105. The radio 105 is connected to receive and transmit RF signals through a receive/transmit (RX/TX) switch 139, as indicated by arrow 171. A transmit path for the radio 105 extends from the radio 105 to the switch 139, as indicated by arrow 171, then from the switch 139 to the power amplifier 107, as indicated by arrow 179, then from the power amplifier 107 to another RX/TX switch 141, as indicated by arrow 183, then from the RX/TX switch 141 to a radio antenna 109, as indicated by arrow 185.

A receive path for the radio 105 extends from the radio antenna 109 to the RX/TX switch 141, as indicated by arrow 185, then from the RX/TX switch 141 to the LNA 137, as indicated by arrow 181, then from the LNA 137 to the RX/TX switch 139, as indicated by arrow 177, then from the RX/TX switch 139 to the radio 105, as indicated by arrow 171. The RX/TX switches 139 and 141 are defined to operate cooperatively such that the transmit and receive paths for the radio 105 can be isolated from each other when performing transmission and reception operations, respectively. In other words, the RX/TX switches 139 and 141 can be operated to route RF signals through the power amplifier 107 during transmission, and around the power amplifier 107 during reception. Therefore, the RF power amplifier 107 output can be isolated from the RF input of the radio 105.

In one embodiment, each of the RX/TX switches 139 and 141 is defined as a model HMC174MS8 switch manufactured by Hittite. However, it should be understood that in other embodiments each of the RX/TX switches 139 and 141 can be defined as another type of RF switch so long as it is capable of transitioning between transmit and receive channels in accordance with a control signal. Also, in one embodiment, the power amplifier 107 is defined as a model HMC414MS8 2.4 GHz power amplifier manufactured by Hittite. However, it should be understood that in other embodiments the power amplifier 107 can be defined as another type of amplifier so long as it is capable of processing RF signals for long-range communication and is power manageable in accordance with a control signal. In one embodiment, the power amplifier 107 and RX/TX switches 139 and 141 can be combined into a single device, such as the model CC2591 device manufactured by Texas Instruments by way of example.

The mLOCK 100 is further equipped with an RX/TX control circuit 189 defined to direct cooperative operation of the RX/TX switches 139 and 141, and to direct power control of the power amplifier 107 and LNA 137. The RX/TX control circuit 189 receives an RX/TX control signal from the chip 101, as indicated by arrow 191. In response to the RX/TX control signal, the RX/TX control circuit 189 transmits respective control signals to the RX/TX switches 139 and 141, as indicated by arrows 193 and 195, respectively, such that continuity is established along either the transmission path or the receive path, as directed by the RX/TX control signal received from the chip 101. Also, in response to the RX/TX control signal, the RX/TX control circuit 189 transmits a power control signal to the power amplifier 107, as indicated by arrow 201. This power control signal directs the power amplifier 107 to power up when the RF transmission path is to be used, and to power down when the RF transmission path is to be idled.

In one embodiment, the LDD 111 includes a processor 113 and a memory 115, such as a RAM, wherein the memory 115 is read and write accessible by the processor 113 for storage of data associated with LDD 111 operation. In one embodiment, the LDD 111 and chip 101 are interfaced together, as indicated by arrow 161, such that the processor 103 of the chip 101 can communicate with the processor 113 of the LDD 111 to enable programming of the LDD 111. In various embodiments, the interface between the LDD 111 and chip 101 may be implemented using a serial port, such as a universal serial bus (USB), conductive traces on the mLOCK 100 printed circuit board, or essentially any other type of interface suitable for conveyance of digital signals. Additionally, it should be understood that in some embodiments, the processor 113 of the LDD 111 can be defined to work in conjunction with, or as an alternate to, the processor 103 of chip 101 in servicing the requirements of the mLOCK 100 when necessary.

Also, in one embodiment, a pin of the LDD 111 is defined for use as an external interrupt pin to enable wakeup of the LDD 111 from a low power mode of operation, i.e., sleep mode. For example, the chip 101 can be connected to the external interrupt pin of the LDD 111 to enable communication of a wakeup signal from the chip 101 to the LDD 111, as indicated by arrow 165. The LDD 111 is further connected to the chip 101 to enable communication of data from the LDD 111 to the chip 101, as indicated by arrow 163.

The LDD 111 is also defined to receive an RF signal, as indicated by arrow 157. The RF signal received by the LDD 111 is transmitted from the LDD antenna 121 to a low noise amplifier (LNA) 117, as indicated by arrow 159. Then, the RF signal is transmitted from the LNA 117 to a signal filter 119, as indicated by arrow 155. Then, the RF signal is transmitted from the filter 119 to the LDD 111, as indicated by arrow 157.

Additionally, in one embodiment, the LDD 111 is defined as a single chip ASIC, including an onboard flash memory 115 and an ARM processor core 113. For example, in various embodiments, the LDD 111 can be implemented as either of the following types of GPS receivers, among others:

a model GSC3f/LP GPS receiver manufactured by SiRF,
a model GSC2f/LP GPS receiver manufactured by SiRF,
a model GSC3e/LP GPS receiver manufactured by SiRF,
a model NX3 GPS receiver manufactured by Nemerix, or
a model NJ030A GPS receiver manufactured by Nemerix.

The LNA 117 and signal filter 119 are provided to amplify and clean the RF signal received from the LDD antenna 121. In one embodiment, the LNA 117 can be implemented as an L-Band device, such as an 18 dBi low noise amplifier. For example, in this embodiment the LNA 117 can be implemented as a model UPC8211TK amplifier manufactured by NEC. In another embodiment, the LNA 117 can be implemented as a model BGA615L7 amplifier manufactured by Infineon. Also, the LNA 117 is defined to have a control input for receiving control signals from the LDD 111, as indicated by arrow 153. Correspondingly, the LNA 117 is defined to understand and operate in accordance with the control signals received from the LDD 111. In the embodiment where the LDD 111 is implemented as the model GSC3f/LP GPS receiver by SiRF, a GPIO4 pin on the GSC3f/LP chip can be used to control the LNA 117 power, thereby enabling the LNA 117 to be powered down and powered up in accordance with a control algorithm.

In one embodiment, the signal filter 119 is defined as an L-Band device, such as a Surface Acoustic Wave (SAW) filter. For example, in one embodiment, the signal filter 119 is implemented as a model B39162B3520U410 SAW filter manufactured by EPCOS Inc. As previously stated, an output of the signal filter 119 is connected to an RF input of the LDD 111, as indicated by arrow 157. In one embodiment, a 50 ohm micro-strip trace on the printed circuit board of the mLOCK 100 is used to connect the output of the signal filter 119 to the RF input of the LDD 111. Also, in one embodiment, the signal filter 119 is tuned to pass RF signals at 1575 MHz to the RF input of the LDD 111.

The mLOCK 100 also includes a data interface 123 defined to enable electrical connection of various external devices to the LDD 111 and chip 101 of the mLOCK 100. For example, in one embodiment, the chip 101 includes a number of reconfigurable general purpose interfaces that are electrically connected to respective pins of the data interface 123. Thus, in this embodiment, an external device (such as a sensor for commercial and/or security applications) can be electrically connected to communicate with the chip 101 through the data interface 123, as indicated by arrow 169. The LDD 111 is also connected to the data interface 123 to enable electrical communication between an external entity and the LDD 111, as indicated by arrow 167. For example, an external entity may be connected to the LDD 111 through the data interface 123 to program the LDD 111. It should be appreciated that the data interface 123 can be defined in different ways in various embodiments. For example, in one embodiment, the data interface 123 is defined as a serial interface including a number of pins to which an external device may connect. In other example, the data interface may be defined as a USB interface, among others.

The mLOCK 100 also includes an extended memory 135 connected to the processor 103 of the chip 101, as indicated by arrow 175. The extended memory 135 is defined as a non-volatile memory that can be accessed by the processor 103 for data storage and retrieval. In one embodiment, the extended memory 135 is defined as a solid-state non-volatile memory, such as a flash memory. The extended memory 135 can be defined to provide segmented non-volatile storage, and can be controlled by the software executed on the processor 103. In one embodiment, separate blocks of memory within the extended memory 135 can be allocated for dedicated use by either security applications or commercial applications. In one embodiment, the extended memory 135 is a model M25P10-A flash memory manufactured by ST Microelectronics. In another embodiment, the extended memory 135 is a model M25PE20 flash memory manufactured by Numonyx. It should be understood that in other embodiments, many other different types of extended memory 135 may be utilized so long as the extended memory 135 can be operably interfaced with the processor 103.

The mLOCK 100 also includes a motion sensor 133 in electrical communication with the chip 101, i.e., with the processor 103, as indicated by arrow 173. The motion sensor 133 is defined to detect physical movement of the mLOCK 100, and thereby detect physical movement of the asset to which the mLOCK 100 is affixed. The processor 103 is defined to receive motion detection signals from the motion sensor 133, and based on the received motion detection signals determine an appropriate mode of operation for the mLOCK 100. Many different types of motion sensors 133 may be utilized in various embodiments. For example, in some embodiments, the motion sensor 133 may be defined as an accelerometer, a gyro, a mercury switch, a micro-pendulum, among other types. Also, in one embodiment, the mLOCK 100 may be equipped with multiple motion sensors 133 in electrical communication with the chip 101. Use of multiple motion sensors 133 may be implemented to provide redundancy and/or diversity in sensing technology/stimuli. For example, in one embodiment, the motion sensor 133 is a model ADXL330 motion sensor manufactured by Analog Devices. In another exemplary embodiment, the motion sensor 133 is a model ADXL311 accelerometer manufactured by Analog Devices. In yet another embodiment, the motion sensor 133 is a model ADXRS50 gyro manufactured by Analog Devices.

The mLOCK 100 also includes a voltage regulator 187 connected to the power source 143. The voltage regulator 187 is defined to provide a minimum power dropout when the power source 143 is implemented as a battery. The voltage regulator 187 is further defined to provide optimized voltage control and regulation to the powered components of the mLOCK 100. In one embodiment, a capacitive filter is connected at the output of the voltage regulator 187 to work in conjunction with a tuned bypass circuit between the power plane of the mLOCK 100 and a ground potential, so as to minimize noise and RF coupling with the LNA's 117 and 137 of the LDD 111 and radio 105, respectively.

Also, in one embodiment, the radio 105 and LDD 111 are connected to receive common reset and brown out protection signals from the voltage regulator 187 to synchronize mLOCK 100 startup and to protect against executing corrupted memory (115/104) during a slow ramping power up or during power source 143, e.g., battery, brown out. In one exemplary embodiment, the voltage regulator 187 is a model TPS77930 voltage regulator manufactured by Texas Instruments. In another exemplary embodiment, the voltage regulator 187 is a model TPS77901 voltage regulator manufactured by Texas Instruments. It should be appreciated that different types of voltage regulator 187 may be utilized in other embodiments, so long as the voltage regulator is defined to provide optimized voltage control and regulation to the powered components of the mLOCK 100.

To enable long-term mLOCK 100 deployment with minimal maintenance, the processor 103 of the chip 101 is operated to execute a power management program for the mLOCK 100. The power management program controls the supply of power to various components within the mLOCK 100, most notably to the LDD 111 and radio 105. The mLOCK 100 has four primary power states:

1) LDD 111 Off and radio 105 Off,
2) LDD 111 Off and radio 105 On,
3) LDD 111 On and radio 105 Off, and
4) LDD 111 On and radio 105 On.

The power management program is defined such that a normal operating state of the mLOCK 100 is a sleep mode in which both the LDD 111 and radio 105 are powered off. The power management program is defined to power on the LDD 111 and/or radio 105 in response to events, such as monitored conditions, external stimuli, and pre-programmed settings. For example, a movement event or movement temporal record, as detected by the motion sensor 133 and communicated to the processor 103, may be used as an event to cause either or both of the LDD 111 and radio 105 to be powered up from sleep mode. In another example, a pre-programmed schedule may be used to trigger power up of either or both of the LDD 111 and radio 105 from sleep mode. Additionally, other events such as receipt of a communications request, external sensor data, geolocation, or combination thereof, may serve as triggers to power up either or both of the LDD 111 and radio 105 from sleep mode.

The power management program is also defined to power down the mLOCK 100 components as soon as possible following completion of any requested or required operations. Depending on the operations being performed, the power management program may direct either of the LDD 111 or radio 105 to power down while the other continues to operate. Or, the operational conditions may permit the power management program to simultaneously power down both the LDD 111 and radio 105.

To support the power management program, the mLOCK 100 utilizes four separate crystal oscillators. Specifically, with reference to FIG. 2, the chip 101 utilizes a 32 MHz (megaHertz) oscillator 125 to provide a base operational clock for the chip 101, as indicated by arrow 149. The chip 101 also utilizes a 32 kHz (kiloHertz) oscillator 127 to provide a real-time clock for wakeup of the chip 101 from the sleep mode of operation, as indicated by arrow 151. The LDD 111 utilizes a 24 MHz oscillator 129 to provide a base operational clock for the LDD 111, as indicated by arrow 147. Also, the LDD 111 utilizes a 32 kHz oscillator 131 to provide a real-time clock for wakeup of the LDD 111 from the sleep mode of operation, as indicated by arrow 145. It should be understood, however, that in other embodiments, other oscillator arrangements may be utilized to provide the necessary clocking for the chip 101 and LDD III. For example, crystal oscillators of different frequency may be used, depending on the operational requirements of the LDD 111 and chip 101.

The lock actuator 146 is defined to receive control signals from the processor 103, as indicated by arrow 176. In response to the control signals received from the processor 103, the lock actuator 146 is defined to generate two discrete amplified signals to provide power to control the lock motor mechanism. The two discrete amplified signals provided by the lock actuator 146 provide power and the correct current polarity to drive the lock motor in each of two possible directions, respectively.

The lock sensors 148 are defined to convey data signals to the processor 103, as indicated by arrow 178. The data signals conveyed by the lock sensors 148 includes a first data signal providing a status of the mLOCK 100 shackle position (open/closed), and a second data signal providing a status of the mLOCK 100 lock motor position (locked/unlocked). The data signals conveyed by the lock sensor 148 are monitored by the processor 103 to enable control and monitoring of the mLOCK 100 state.

The user interface display 144 and associated user input button(s) are defined to bi-directionally communicate with the processor 103. The user interface display 144 is managed by the processor 103. In one embodiment, data transmitted from the processor 103 to the user interface display 144 is rendered in the user interface display 144 in text form, i.e., in alpha-numeric form. Additionally, the processor 103 monitors the status of the one or more user input buttons to allow the user to control/select information rendered in the user interface display 144 and/or to trigger certain conditions in the mLOCK 100.

Figure 3:
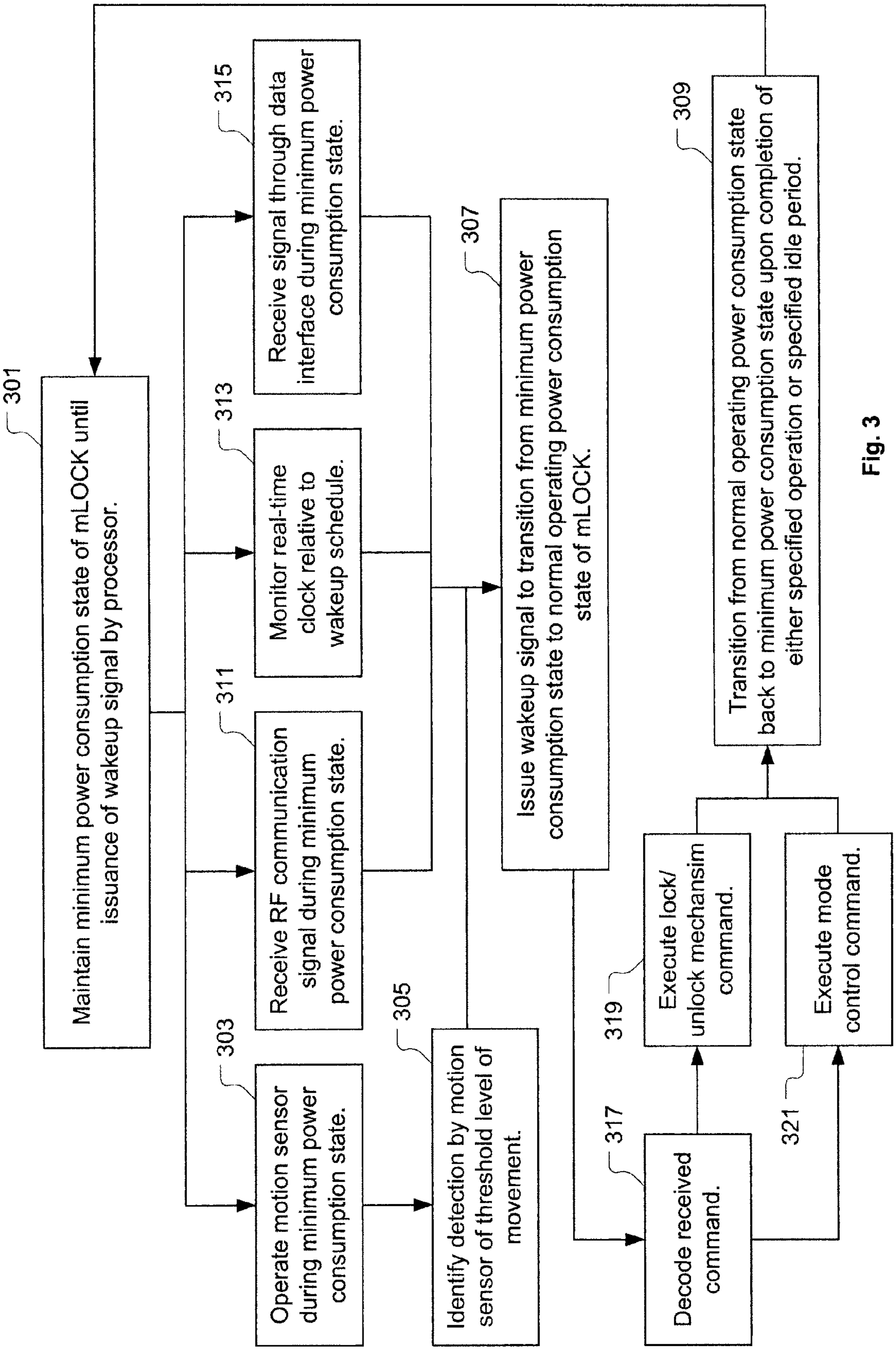
FIG. 3 is an illustration showing a flowchart of a method for operating a radiofrequency tracking and communication device, i.e., mLOCK, in accordance with one embodiment of the present invention.

FIG. 3 is an illustration showing a flowchart of a method for operating a radiofrequency tracking and communication device, i.e., mLOCK 100, in accordance with one embodiment of the present invention. The method of FIG. 3 represents an example of how the power management program can be implemented within the mLOCK 100. The method includes an operation 301 for maintaining a minimum power consumption state of the mLOCK 100 until issuance of a wakeup signal by the processor 103. As mentioned above, the minimum power consumption state of the mLOCK 100 exists when both the LDD 111 and the radio 105 are powered off.

The method also includes an operation 303 for operating the motion sensor 133 during the minimum power consumption state. The method further includes an operation 305 for identifying detection by the motion sensor 133 of a threshold level of movement. It should be understood that because the motion sensor 133 is disposed onboard the mLOCK 100, the threshold level of movement detected by the motion sensor 133 corresponds to movement of the mLOCK 100, and the asset to which the mLOCK 100 is affixed.

In one embodiment, the threshold level of movement is defined as a single motion detection signal of at least a specified magnitude. In this embodiment, the processor 103 is defined to receive the motion detection signal from the motion sensor 133 and determine whether the received motion detection signal exceeds a specified magnitude as stored in the memory 104. In another embodiment, the threshold level of movement is defined as an integral of motion detection signals having reached at least a specified magnitude. In this embodiment, motion detection signals are received and stored by the processor 103 over a period of time. The processor 103 determines whether or not the integral, i.e., sum, of the received motion detection signals over the period of time has reached or exceeded a specified magnitude as stored in the memory 104. Additionally, the two embodiments regarding the threshold level of movement as disclosed above may be implemented in a combined manner.

In response to identifying that the threshold level of movement has been reached or exceeded, the method includes an operation 307 for issuing the wakeup signal to transition from the minimum power consumption state to a normal operating power consumption state of the mLOCK 100. The wakeup signal is generated by the processor 103, upon recognition by the processor 103 that the threshold level of movement has been reached or exceeded. The processor 103 can be operated to transmit the wakeup signal to either or both the LDD 111 and radio 105, depending on an operation sequence to be performed upon reaching the threshold level of movement.

With reference back to operation 301, the method may proceed with an operation 311 in which an RF communication signal is received during the minimum power consumption state. In response to receiving the RF communication signal, the method proceeds with the operation 307 for issuing the wakeup signal to transition the mLOCK 100 from the minimum power consumption state to the normal operating power consumption state. Again, the wakeup signal is generated by the processor 103, and may direct the radio 105, LDD 111, or both to power up, depending on the content of the received RF communication signal.

Also, with reference back to operation 301, the method may proceed with an operation 313 for monitoring a real-time clock relative to a wakeup schedule. In one embodiment, the monitoring of the real-time clock relative to the wakeup schedule is performed by the processor 103 while the mLOCK 100 is in the minimum power consumption state. Upon reaching a specified wakeup time in the wakeup schedule, the method proceeds with operation 307 to issue the wakeup signal to transition the mLOCK 100 from the minimum power consumption state to the normal operating power consumption state.

With reference back to operation 301, the method may proceed with an operation 315 for receiving a signal through the data interface 123 during the minimum power consumption state. In one embodiment, the signal received through the data interface 123 may be a data signal generated by an external device connected to the data interface 123. For example, a sensor may be connected to the data interface 123, and may transmit a data signal indicative of a monitored alarm or condition that triggers the processor 103 to generate a wakeup signal to power up either or both of the LDD 111 and radio 105. For example, the data signal may be a push button signal, an intrusion alarm signal, a chemical/biological agent detection signal, a temperature signal, a humidity signal, or essentially any other type of signal that may be generated by a sensing device.

Additionally, a user may connect a computing device, such as a handheld computing device or laptop computer, to the data interface 123 to communicate with the LDD 111 or processor 103. In one embodiment, connection of the computing device to the data interface 123 will cause the processor 103 to generate a wakeup signal to power up either or both of the LDD 111 and radio 105. In response to receiving the signal through the data interface 123 in operation 315, the method proceeds with the operation 307 for issuing the wakeup signal to transition the mLOCK 100 from the minimum power consumption state to the normal operating power consumption state. Again, in operation 307, the wakeup signal is generated by the processor 103, and may direct the radio 105, LDD 111, or both to power up, depending on the type of signal received through the data interface 123.

Upon transitioning to the normal operating power consumption state, the mLOCK 100 may perform an operation 317 to decode a received command. It should be understood that the mLOCK 100 can be "awakened" by many different means, including but not limited to, a keychain controller, a remote control, a radio network, or by geographical proximity to a waypoint. If the received command is a lock actuator 146 command, an operation 319 is performed in which the lock actuator 146 executes the lock/unlock mechanism command. If the received command is a mode control command, an operation 321 is performed in which the processor 103 sets the corresponding mode configuration parameters in the mLOCK 100 software/hardware. Example mode control commands can include display and/or entry of waypoint settings, mLOCK 100 security settings, mLOCK 100 identification settings, radio channel settings, schedules, secure network encryption keys, or any combination thereof, among others. The method also includes an operation 309 in which the mLOCK 100 is transitioned from the normal operating power consumption state back to the minimum power consumption state upon completion of either a specified operation or a specified idle period by the mLOCK 100.

An inductive loop is integrated into the mLOCK 100 to provide for RF impedance matching between the various RF portions of the mLOCK 100. In one embodiment, the inductive loop is tuned to provide a 0.5 nH (nanoHertz) reactive load over a wavelength trace. In one embodiment, the impedance match between the RF output from the radio 105 and the RX/TX switch 139 is 50 ohms. Also, the RF power amplifier 107 is capacitively coupled with the RX/TX switch 141. Additionally, in one embodiment, to provide for decoupling of the power source 143 from the radio 105, eight high frequency ceramic capacitors are tied between the power pins of the chip 101 and the ground potential of the mLOCK 100.

In one embodiment, a power plane of the chip 101 is defined as a split independent inner power plane that is DC-coupled with the LDD 111 power plane through an RF choke and capacitive filter. In this embodiment, noise from a phase lock loop circuit within the radio 105 will not couple via the inner power plane of the chip 101 to the power plane of the LDD 111. In this manner, radio harmonics associated with operation of the radio 105 are prevented from significantly coupling with the LDD 111 during simultaneous operation of the both the radio 105 and LDD 111, thereby maintaining LDD 111 sensitivity.

An impedance matching circuit is also provided to ensure that the RF signal can be received by the LDD 111 without substantial signal loss. More specifically, the RF input to the LDD 111 utilizes an impedance matching circuit tuned for dielectric properties of the mLOCK 100 circuit board. In one embodiment, the connection from the LDD antenna 121 to the LNA 117 is DC-isolated from the RF input at the LNA 117 using a 100 pf (picofarad) capacitor, and is impedance matched to 50 ohms. Also, in one embodiment, the output of the LNA 117 is impedance matched to 50 ohms.

Figure 4A:
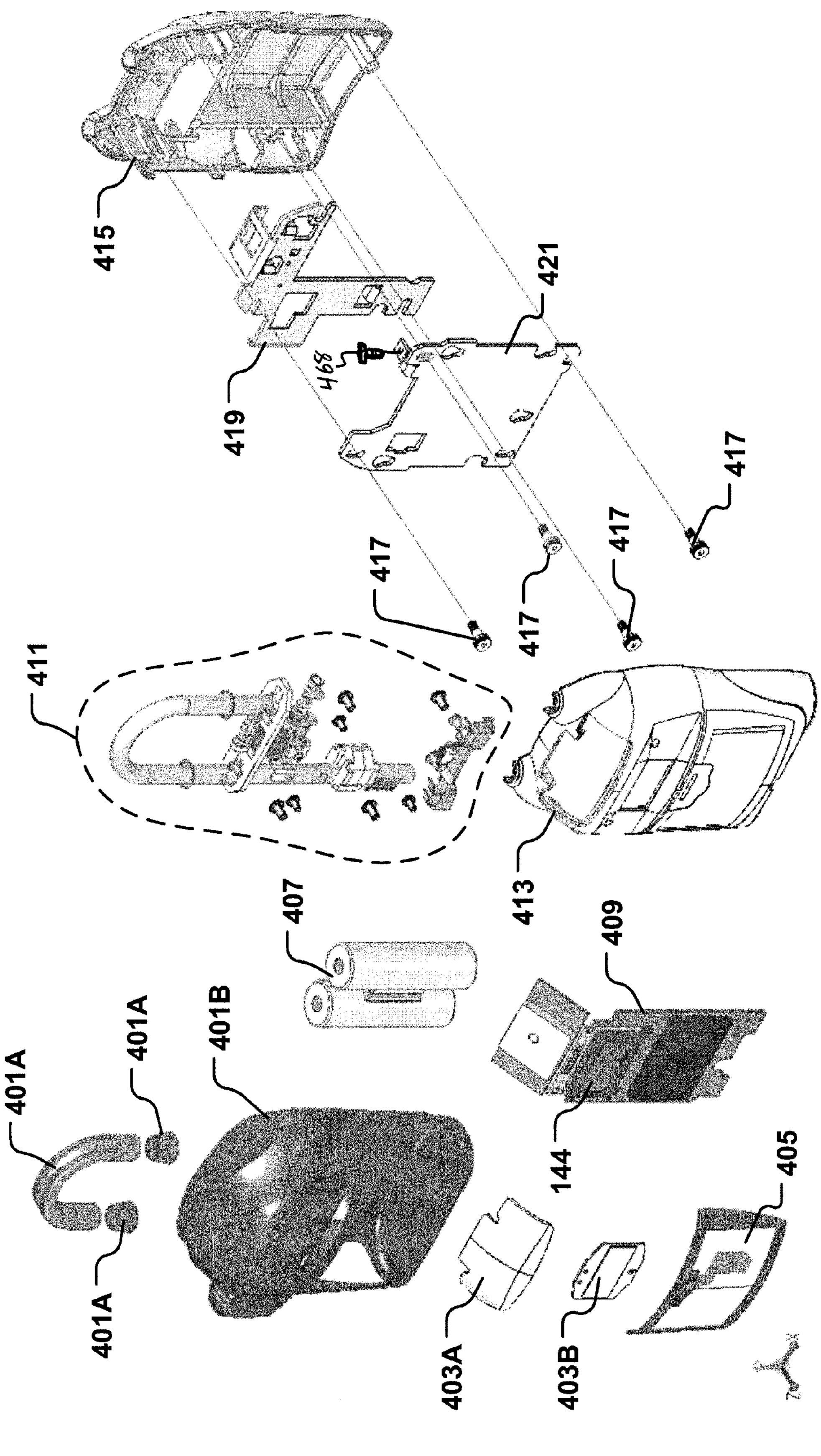
FIG. 4A shows the physical components of the mLOCK, in accordance with one embodiment of the present invention.
Figure 4B:
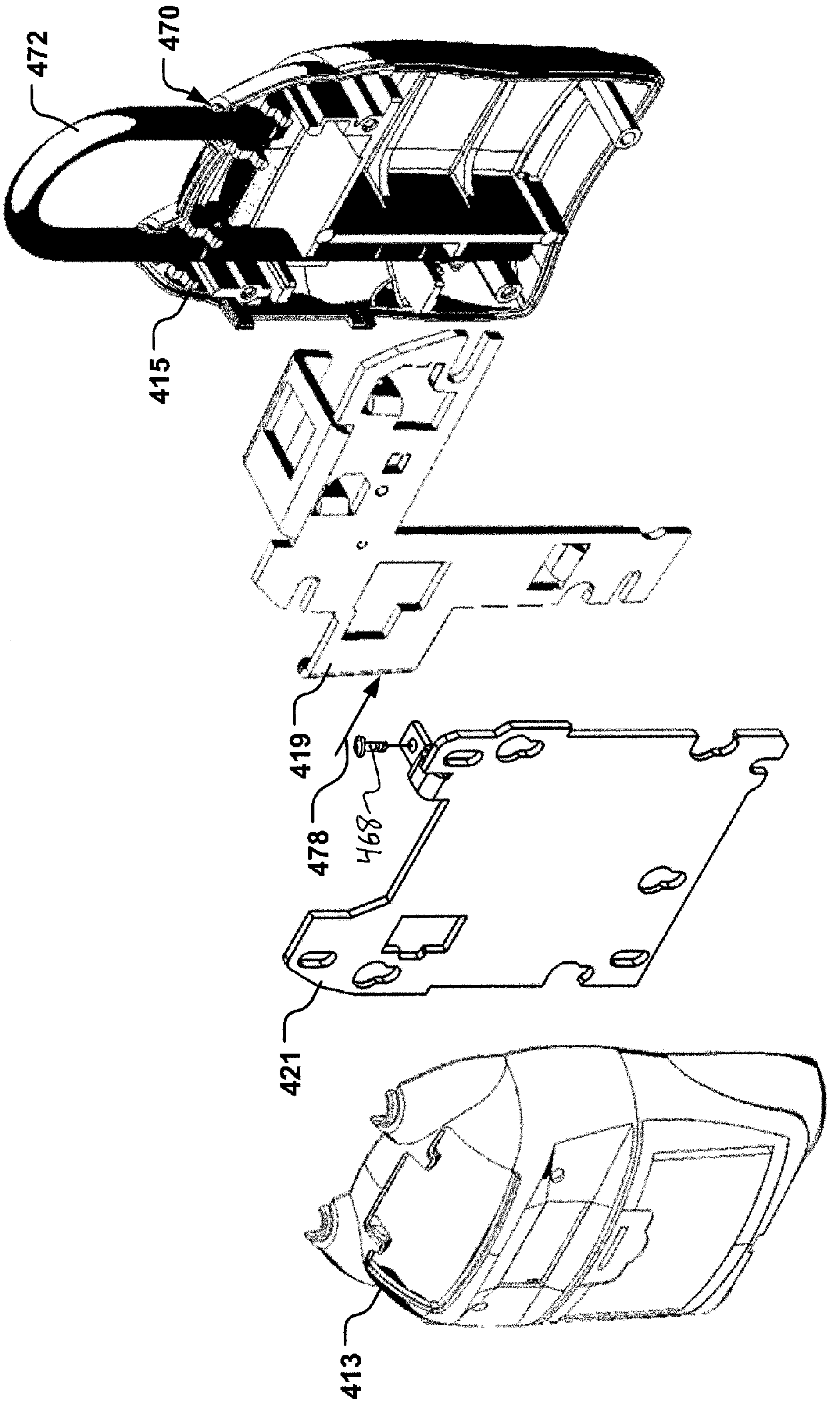
FIG. 4B shows a closer expanded view of the front shell, rear shell, interlocking plate, and push plate, in accordance with one embodiment of the present invention.
Figure 4C:
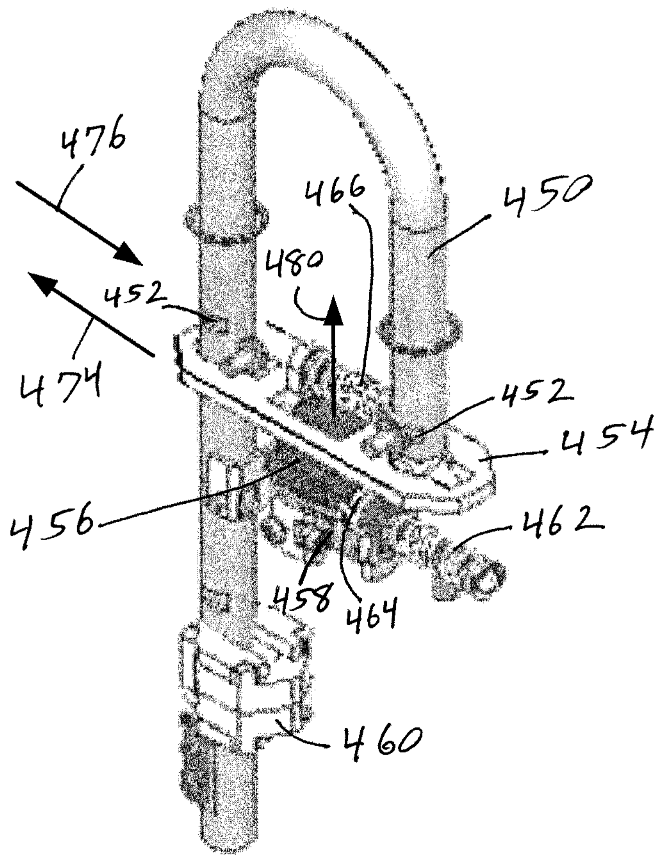
FIG. 4C shows an expanded view of the shackle and locking mechanism component of reference, in accordance with one embodiment of the present invention.

FIG. 4A shows the physical components of the mLOCK 100, in accordance with one embodiment of the present invention. Electronics 409 are defined on a printed circuit board as described above with regard to FIG. 2. In addition to the components described with regard to FIG. 2, the electronics 409 also include the user interface display 144. Electrical power for the mLOCK 100 is provided by a battery 407. Also, in one embodiment, the mLOCK 100 includes a solar film 405 defined to provide trickle-charging to the battery 407 to extend the battery 407 life. Shackle and locking mechanism components are also shown, as indicated by reference 411. FIG. 4C shows a more detailed view of the shackle and locking mechanism components of reference 411. The electronics 409, battery 407, solar film 405, shackle and locking mechanism components 411 are secured within the body, i.e., shell, of the mLOCK 100. FIG. 4B shows a closer expanded view of the front shell 413, rear shell 415, interlocking plate 421, and push plate 419, in accordance with one embodiment of the present invention.

The body of the mLOCK 100 is defined by a front shell 413 and a rear shell 415, which fit together in a sandwiched manner to enclose the mLOCK 100 components. Also, the mLOCK 100 includes a push plate 419 and an interlocking plate 421. The push plate is movable inside the shell of the mLOCK 100. The interlocking plate 421 is connected to the rear shell 415 by way of fasteners 417. When an external force is applied to move the push plate 419, the push plate 419 moves within the mLOCK 100 to disengage the locking mechanism of the shackle. This is described in more detail with regard to FIG. 4C. The mLOCK 100 also includes button overlays 403A and a display overlay 403B. Also, to enhance durability in one embodiment, the mLOCK 100 can include rubber shackle molds 401A and a rubber body mold 401B.

It should be appreciated that the mLOCK 100 does not include any external assembly features that can be accessed to disassemble the mLOCK 100 once it has been locked. The mLOCK 100 can only be disassembled via a set screw 468 that is internal to the mLOCK 100. This set screw 468 is accessible only when the mLOCK 100 shackle has been unlocked and opened.

FIG. 4C shows an expanded view of the shackle and locking mechanism component of reference 411, in accordance with one embodiment of the present invention. A shackle 450 is defined to be disposed within a channel within the rear shell 415 of the mLOCK 100. The shackle 450 is defined to be movable along the channel length and is defined to be rotatable within the channel. A retainer 460 is attached to the shackle 450 to prevent the shackle 450 from being completely withdrawn from the channel and to control an amount of rotation of the shackle 450 within the channel. The shackle 450 is defined to insert into an opening 470 in the shell to close a shackle loop 472. The shackle 450 is also defined to release from the opening 470 in the shell to open the shackle loop 472.

A latch plate is disposed inside the shell and is defined to engage the shackle 450 to lock the shackle 450, when the shackle 450 is inserted into the opening 470 in the shell to close the shackle loop 472. More specifically, the latch plate is defined to move in a direction 474 to engage with locking slots 452 formed within the shackle 450, and to move in a direction 476 to disengage from the locking slots 452 formed within the shackle 450. As previously mentioned, the push plate 419 is disposed inside the shell and is defined to moved in the direction 474 and 476. Specifically, the push plate 419 is defined to move in the direction 476 when an external force is applied to the push plate 419, as indicated by arrow 478 in FIG. 4B.

A motor 458 is mechanically fixed to the push plate 419, such that when the push plate 419 moves in the directions 474 and 476, the motor 458 moves with the push plate 419 in the same direction. A cam 456 is mechanically connected to be moved by the motor 458, in a direction 480, to engage with the latch plate 454. The cam 456 is rigidly connected to the motor 458 such that movement of the motor 458 through movement of the push plate 419 causes corresponding movement of the cam 456. Therefore, movement of the push plate 419 in the direction 476 by the applied external force 478, with the motor 458 operated to engage the cam 456 with the latch plate 454, causes the latch plate 454 to move in the direction 476 to disengage from the shackle 450, thereby freeing the shackle 450 to release from the shell to open the shackle loop 472.

A first spring 464 is defined to disengage the cam 456 from the latch plate 454 when the motor 458 is not powered to move the cam 456 to engage with the latch plate 454. In one embodiment, the first spring 464 is a torsional spring. A second spring 466 is defined to engage the latch plate 454 with the shackle 450, i.e., with the locking slots 452 of the shackle 450, in an absence of the applied external force 478 to move the push plate 419 when the cam 456 is also moved to engage the latch plate 454. A third spring 462 is defined to resist the external force 478 applied to move the push plate 419, such that the push plate 419 is returned to its home position in the absence of the applied external force 478.

The interlocking plate 421 is disposed within the body of the mLOCK 100 and secured to the shell 415 to cover the push plate 419, the motor 458, the cam 456, the latch plate 454, and the shackle 450, such that the locking mechanism of the mLOCK 100 cannot be accessed without removal of the interlocking plate 421. Also, the interlocking plate 421 is secured to the shell 415 by a fastener, i.e., set screw 468, that is only accessible through the opening 470 in the shell 415 when the shackle 450 is released from the opening 470 in the shell 415 to open the shackle loop 472.

It should be understood that the push plate 419 and the latch plate 454 physically interface with each other such that a force applied to the shackle 450 is transferred through the shackle 450 to the latch plate 454 to the push plate 419 to the shell 415. Therefore, the motor 458 and cam 456 are isolated from any force applied to the shackle 450. Additionally, the processor onboard the mLOCK 100 is defined to monitor a state of the mLOCK 100, and autonomously control the motor 458 to move the cam 456 based on the monitored state of the mLOCK 100.

In one embodiment, a locking device, i.e., the mLOCK 100, is disclosed. The locking device includes a processor defined to control operation of the locking device. The locking device also includes a radio defined in electrical communication with the processor, and a location determination device defined in electrical communication with the processor. A combination of the processor, the radio, and the location determination device forms a wireless tracking and communication system onboard the locking device. The locking device also includes a shackle and a locking mechanism defined in electrical communication with the processor. The processor is defined to operate the locking mechanism to control locking and unlocking of the shackle based on information obtained through the wireless tracking and communication system.

The processor is defined to operate the locking mechanism based on one or more of a proximity of the locking device to a secure wireless communication network, a terrestrial position of the locking device, and one or more commands received through the wireless tracking and communication system. The locking device also includes a memory disposed in electrical communication with the processor for recording data. The recorded data can include program instructions for operating the wireless tracking and communication system, settings associated with operation of the locking device, a time-dependent status of the locking device, among other types of data. Also, the locking device includes a user interface display disposed in electrical communication with the processor and defined to visually render data recorded in the memory. The locking device further includes a user interface control device disposed in electrical communication with the processor and defined to control which data is rendered in the user interface display. In one embodiment, the user interface display is a liquid crystal display, and the user interface control device is a mechanical button.

As discussed above, the locking mechanism also includes a latch plate defined to be movable to engage with and lock the shackle, and defined to be movable to disengage from and unlock the shackle. The locking mechanism also includes a cam defined to be movable in a first direction to engage with the latch plate such that movement of the cam in a second direction causes movement of the latch plate in the second direction. The locking mechanism also includes a motor mechanically connected to control movement of the cam in the first direction to engage with the latch plate. The motor is electrically connected to be controlled by the processor. Also, the locking device includes lock sensors defined to determine a position of the cam relative to the latch plate and electrically communicate the determined position of the cam to the processor. It should be appreciated that the shackle can only be unlocked through operation of the processor to control the motor to move the cam to engage the latch plate.

Figure 5:
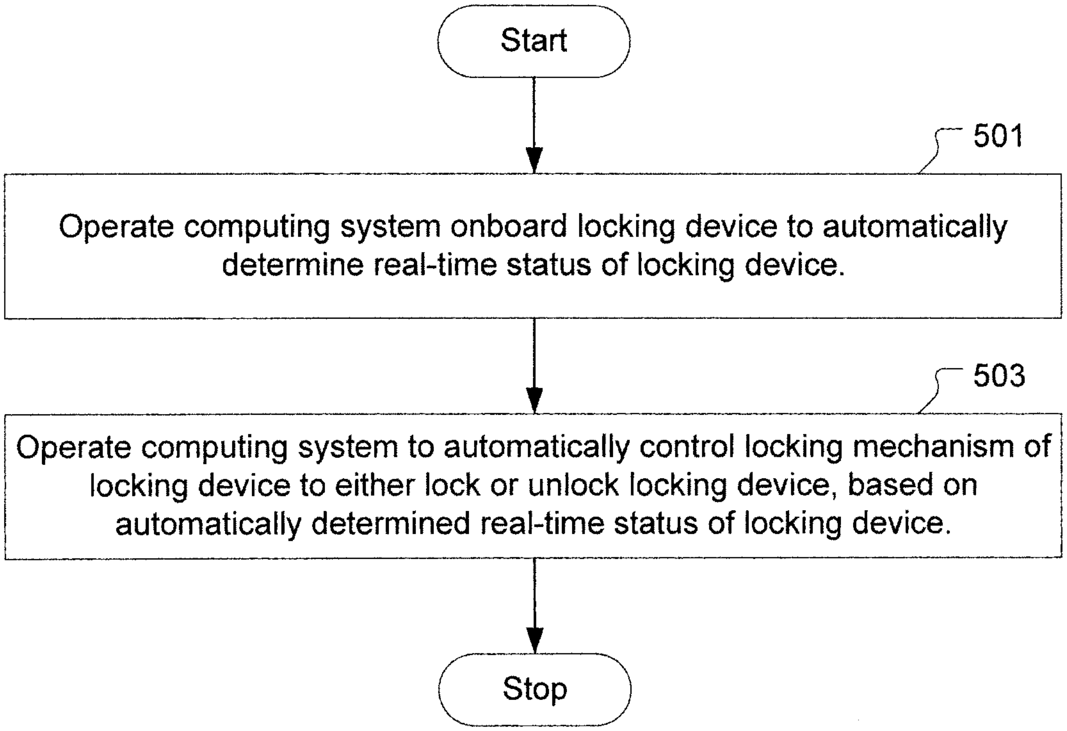
FIG. 5 shows a flowchart of a method for autonomous operation of a locking device based on a status of the locking device, in accordance with one embodiment of the present invention.

FIG. 5 shows a flowchart of a method for autonomous operation of a locking device based on a status of the locking device, in accordance with one embodiment of the present invention. The method includes an operation 501 for operating a computing system onboard the locking device to automatically determine a real-time status of the locking device. The method also includes an operation 503 for operating the computing system to automatically control a locking mechanism of the locking device to either lock or unlock the locking device, based on the automatically determined real-time status of the locking device.

In one embodiment, the real-time status of the locking device includes one or more of a presence of any pending command to be executed by the computing system, a presence of a user interaction with a control of the locking device, a presence of a scheduled task to be performed by the computing system, a current state of a power supply of the locking device, and a current environment state of the locking device. In one embodiment, the current environment state of the locking device includes one or more of a current state of motion of the locking device, a current terrestrial position of the locking device, a current proximity of the locking device to a wireless communication network to which the computing system can wirelessly communicate, a temperature near the locking device, a humidity near the locking device, a radioactivity level near the locking device, a chemical presence near the locking device, and an external movement near the locking device.

In one embodiment, operating the computing system onboard the locking device to automatically determine the real-time status of the locking device in operation 501 includes operating a wireless tracking system within the computing system onboard the locking device to determine a terrestrial position of the locking device.

In one embodiment, operating the computing system onboard the locking device to automatically determine the real-time status of the locking device in operation 501 includes operating a wireless communication system within the computing system onboard the locking device to access a wireless network and receive commands from one or more sources over the wireless network. The received commands update the real-time status of the locking device to direct the computing system onboard the locking device to either lock or unlock the locking device.

In one embodiment, operating the computing system onboard the locking device to automatically determine the real-time status of the locking device in operation 501 includes operating the computing system to acquire data from one or more sensors proximate to the locking device. In this embodiment, some of the one or more sensors proximate to the locking device can be physically attached to the locking device and communicate data with the computing system through wired connections. Also, in this embodiment, some of the one or more sensors proximate to the locking device may not be physically attached to the locking device and can communicate data with the computing system through a wireless means. In various embodiments, the one or more sensors can include one or more of a movement sensor, a temperature sensor, a humidity sensor, an infrared sensor, a radioactivity detection sensor, an acoustic sensor, and a chemical detection sensor, among others.

In one embodiment, the method can also include an operation for operating the computing system onboard the locking device to automatically record data in a memory onboard the locking device. In this embodiment, the data includes information about the determined real-time status of the locking device. For example, the data can include time-stamped information about one or more of a terrestrial position of the locking device, a security event associated with the locking device, a shackle state of the locking device, a network communication received or transmitted by the computing system onboard the locking device, a physical movement of the locking device, and an environmental condition to which the locking device is exposed, among other types of data. Additionally, the method can include operation of a wireless communication system within the computing system onboard the locking device to transmit data automatically recorded in the memory onboard the locking device to a receiver within a wireless network within range of the locking device.

As described herein, the mLOCK 100 is an electronic lock that can automatically secure an asset by activating a locking mechanism therein when the mLOCK 100 is either a) out of range of a secured network, b) has departed from a predetermined waypoint based on latitude and longitude (GPS), c) has an expired schedule, or d) has detected motion. Also, the mLOCK 100 can be set to automatically unlock when the mLOCK 100 negotiates with a secure network or arrives at a user defined waypoint. The behavior of the mLOCK 100 can be modified by remote (and secure) commands, thereby allowing the mLOCK 100 behavior to be configured for specific uses at specific times, e.g., on a shipping container trip-by-trip basis.

The expansion of global commerce drives the shipping industry. Ships, trains, and trucks move cargo containers around the world relatively unattended and unnoticed. These are areas of vulnerability that terrorists and thieves can exploit. It should be appreciated that the mLOCK 100 is particularly well-suited for application in shipping container security, container trucking operations, and air cargo container security. In particular, the mLOCK 100 provides protection against hazardous materials being placed inside of a cargo container or valuable assets being removed from the container using its features described herein, including: a) door lock with shackle open/close/cut alarms, b) embedded location and tracking information, and c) worldwide, multi-mode communication links. To exemplify the particular utility of the mLOCK 100 device, a few example applications are described below, include air cargo security, inbond shipping, and anti-pilferage. It should be understood, however, that these are a few examples of how the mLOCK 100 may be utilized and in no way represent an exclusive set of mLOCK 100 applications.

Air Cargo Security

The U.S. Congress has directed the U.S. Transportation Security Agency (TSA) to monitor air cargo that is destined for placement inside the holding compartment of passenger planes. The current method of security is to have a TSA agent drive a car behind delivery trucks from the point where cargo is added to the truck to the airport where the contents of the truck are loaded onto the passenger plane.

The mLOCK is part of a system that would automate the tracking, monitoring, and security of the truck from the point-of-stuffing to the point-of-devanning. The scenario may involves the following steps:

(a) Freight forwarder sets up inventory of mLOCKs 100.

(b) An mLOCK 100 is chosen from inventory for commissioning.

(c) Freight forwarder logs into secure website to transmit destination and vehicle license plate information to the mLOCK 100 via either a wireless or wired connection.

(d) mLOCK 100 is taken to vehicle and the license plate of the vehicle is compared to the license plate information displayed on the mLOCK 100 user interface display 144.

(e) mLOCK 100 is opened and placed on doors of truck securing the doors shut.

(f) The driver of the truck is provided with a keyfob that can unlock or lock the mLOCK 100.

(g) If the driver forgets to lock the mLOCK 100, the mLOCK 100 firmware automatically locks the mLOCK 100 after travel outside of the trusted zone (either wireless beacon drop-off or geofence area) programmed during commissioning.

(h) If the driver unlocks and opens the mLOCK 100 in route to the airport and outside of a trusted zone, the mLOCK 100 generates an alarm and immediately transmits the alarm via the mLOCK's 100 embedded Wide Area Network module (e.g. cellular or satellite) to a TSA website.

(i) Upon arrival at the airport, a TSA agent looks at the mLOCK 100 user interface display 144 to see if an alarm was generated in route. If so, the mLOCK 100 is removed and the truck is inspected. If not, the mLOCK 100 is removed and returned to the freight forwarder for use in future shipments.

Inbond Shipping

The U.S. Customs and Border Protection (CBP) agency collects fees from shippers whose cargo transits the United States and is bound for a foreign country. This is known as an inbond shipment. For example, a Canadian company is selling radio parts to a distributor in Mexico. When the truck from Canada arrives at the U.S. border crossing, the manifest shows an estimated date for crossing the border into Mexico. CBP does not currently have a means to verify when and if the truck left the country, so fee collection is based upon the manifest estimate. This presents both a security risk and a potential loss of revenue for CBP.

The mLOCK can be used as follows for Inbond Shipping:

(a) Border crossings maintain an inventory of mLOCKs 100.

(b) A CBP agent commissions an mLOCK 100 with license plate identifier, destination, and estimated departure date using a secure CBP website that transmits the data to the mLOCK 100 using either a wired or wireless connection.

(c) The CBP agent confirms the license ID of the truck with the license information displayed on the mLOCK 100 user interface display 144 and attaches the mLOCK 100 to the door of the truck.

(d) When the truck leaves the trusted area of the CBP inspection center, the mLOCK 100 automatically locks due to either a loss of a wireless signal or movement beyond a geofence area.

(e) While in transit across the U.S., the mLOCK 100 logs location information.

(f) If the mLOCK 100 shackle is cut or otherwise opened, the mLOCK 100 will log this as an alarm and transmit the alarm and truck location via the mLOCK's 100 embedded Wide Area Network module to the CBP.

(g) If the truck does not cross an exit geofence point within the designated time, the mLOCK 100 logs on and transmits an alarm and truck location to CBP via the mLOCK's 100 Wide Area Network module.

(h) Upon the truck's arrival at the departure point, the CBP agent will be aware of any in transit alarms and can verify the alarm state via the mLOCK's 100 user interface display 144.

(i) The CBP agent can unlock the mLOCK 100 via either a handheld reader that queries the mLOCK 100 for additional information or via a trusted zone wireless signal that will automatically unlock the mLOCK 100.

(j) The mLOCK 100 is removed and used for the next inbond shipment.

Anti-Pilferage

While the government agencies are focused mainly on what goes into a truck or container, the commercial shipper is more concerned with what is taken out of the truck or container. The mLOCK 100 provides a means for inhibiting access to the truck or container through the primary door. Using trusted zones, such as the stored waypoints on the mLOCK 100 or authorized radio signal emitter, the mLOCK 100 can automatically unlock and lock. Also, additional sensors inside the truck or container that are equipped with a compatible wireless device can transmit state-of-health information to the mLOCK's 100 wireless radio. The mLOCK 100 can then upload location and sensor information while in route based upon the mLOCK's 100 commissioned thresholds and schedules and via the mLOCK's 100 embedded Wide Area Network module in cases where a Local Area Network compatible with the mLOCK's 100 RF signal is not available.

It should be understood that portions of the invention described herein can be embodied as computer readable code on a computer readable medium. The computer readable medium is any data storage device that can store data which can thereafter be read by a computer system. Portions of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A locking device, comprising:

a processor defined to control operation of the locking device;

a radio defined in electrical communication with the processor;

a location determination device positioned within the locking device, the location determination device defined in electrical communication with the processor, wherein a combination of the processor, the radio, and the location determination device forms a wireless tracking and communication system;

a shackle;

a locking mechanism defined in electrical communication with the processor, wherein the processor is defined to operate the locking mechanism to control locking and unlocking of the shackle based on information obtained through the wireless tracking and communication system, wherein the locking mechanism includes a latch plate defined to be movable to engage with and lock the shackle, and defined to be movable to disengage from and unlock the shackle, wherein the locking mechanism also includes a cam defined to be movable in a first direction to engage with the latch plate such that movement of the cam in a second direction causes movement of the latch plate in the second direction, and wherein the locking mechanism also includes a motor mechanically connected to control movement of the cam in the first direction to engage with the latch plate, wherein the motor is electrically connected to be controlled by the processor; and lock sensors defined to determine a position of the cam relative to the latch plate and electrically communicate the determined position of the cam to the processor.

2. A locking device as recited in claim 1, further comprising:

a power source defined to supply electrical power to the processor, the radio, the location determination device, and the locking mechanism.

3. A locking device as recited in claim 2, further comprising:

a solar film electrically connected to the power source and defined to electrically re-charge the power source.

4. A locking device as recited in claim 1, wherein the radio is an international frequency radio, and wherein the location determination device is a global positioning system receiver device.

5. A locking device as recited in claim 1, wherein the processor is defined to operate the locking mechanism based on one or more of a proximity of the locking device to a secure wireless communication network, a terrestrial position of the locking device, and one or more commands received through the wireless tracking and communication system.

6. A locking device as recited in claim 1, wherein the shackle can only be unlocked through operation of the processor to control the motor to move the cam to engage the latch plate.

7. A locking device as recited in claim 1, further comprising:

a memory disposed in electrical communication with the processor for recording data, the data including program instructions for operating the wireless tracking and communication system, the data also including settings associated with operation of the locking device, the data also including a recording of a time-dependent status of the locking device;

a user interface display disposed in electrical communication with the processor and defined to visually render data recorded in the memory; and a user interface control device disposed in electrical communication with the processor and defined to control which data is rendered in the user interface display.

8. A locking device as recited in claim 7, wherein the user interface display is a liquid crystal display, and wherein the user interface control device is a mechanical button.

9. A locking device, comprising:

a shell;

a shackle disposed within a channel inside the shell, the shackle defined to insert into an opening in the shell to close a shackle loop, the shackle defined to release from the opening in the shell to open the shackle loop;

a latch plate disposed inside the shell and defined to engage the shackle to lock the shackle when inserted into the shell to close the shackle loop;

a push plate disposed inside the shell, the push plate defined to be moved within the shell by an applied external force;

a motor mechanically fixed to the push plate;

a cam mechanically connected to be moved by the motor to engage with the latch plate, whereby movement of the push plate by the applied external force with the motor operated to engage the cam with the latch plate causes the latch plate to move to disengage from the shackle, thereby freeing the shackle to release from the shell to open the shackle loop; and a processor defined onboard the locking device to monitor a state of the locking device and autonomously control the motor to move the cam based on the monitored state of the locking device.

10. A locking device as recited in claim 9, wherein the cam is rigidly connected to the motor such that movement of the motor through movement of the push plate causes corresponding movement of the cam.

11. A locking device as recited in claim 9, further comprising:

a first spring defined to disengage the cam from the latch plate when the motor is not powered to move the cam to engage with the latch plate;

a second spring defined to engage the latch plate with the shackle in an absence of the applied external force to move the push plate when the cam is also moved to engage the latch plate; and a third spring defined to resist the external force applied to move the push plate such that the push plate is returned to its home position in the absence of the applied external force.

12. A locking device as recited in claim 9, wherein the push plate and latch plate physically interface with each other such that a force applied to the shackle is transferred through the shackle to the latch plate to the push plate to the shell.

13. A locking device as recited in claim 9, wherein the motor is isolated from a force applied to the shackle.

14. A locking device as recited in claim 9, further comprising:

an interlocking plate disposed within and secured to the shell to cover the push plate, the motor, the cam, the latch plate, and the shackle such that a locking mechanism of the locking device cannot be accessed without removal of the interlocking plate, and wherein the interlocking plate is secured to the shell by a fastener that is only accessible through the opening in the shell when the shackle is released from the opening in the shell to open the shackle loop.

* * * * *